United States Patent [19]
Takasaki et al.

[11] Patent Number: 6,155,156
[45] Date of Patent: Dec. 5, 2000

[54] BRAKE BOOSTER

[75] Inventors: Yoshiyasu Takasaki, Saitama-Ken; Mamoru Sawada; Yuzo Imoto, both of Aichi-Pref, all of Japan

[73] Assignees: Jidosha Kiki Co., Ltd., Tokyo; Denso Corporation, Kariya, both of Japan

[21] Appl. No.: 09/187,959

[22] Filed: Nov. 6, 1998

[30] Foreign Application Priority Data

| Nov. 21, 1997 | [JP] | Japan | 9-338038 |
| Nov. 28, 1997 | [JP] | Japan | 9-343746 |
| Jan. 16, 1998 | [JP] | Japan | 10-020433 |
| Oct. 13, 1998 | [JP] | Japan | 10-290267 |
| Oct. 13, 1998 | [JP] | Japan | 10-290269 |
| Oct. 13, 1998 | [JP] | Japan | 10-290270 |

[51] Int. Cl.$^7$ ............................................. F15B 13/16
[52] U.S. Cl. ...................... 91/367; 91/376 R; 303/113.3; 303/114.3
[58] Field of Search .................. 91/367, 376 R; 303/114.3, 113.3

[56] References Cited

U.S. PATENT DOCUMENTS 5,704,270  1/1998  Tsubouchi ............................. 91/376 R

FOREIGN PATENT DOCUMENTS 3-31050  2/1991  Japan .

*Primary Examiner*—Edward K. Look
*Assistant Examiner*—Thomas E. Lazo
*Attorney, Agent, or Firm*—Flynn, Thiel, Boutell & Tanis, P.C.

[57] ABSTRACT

A brake booster includes a solenoid disposed within a valve body. When the solenoid is energized under the inoperative condition of the brake booster, a piston associated with the solenoid is moved to its operative position to close a vacuum valve while opening an atmosphere valve. This allows the brake booster to be operated as an automatic brake without depressing a brake pedal. The brake booster also comprises output restriction means which may comprise a spring 55 shown in FIG. 1, for example, whereby as the output increases when the brake booster is operated as an automatic brake, the output restriction means operates to cease an increase in the output. With this arrangement, if the solenoid is energized inadvertently independently from the intent of a driver, the occurrence of a quick braking action is avoided, but a gentle braking action is assured, thus improving the safeguard.

12 Claims, 8 Drawing Sheets

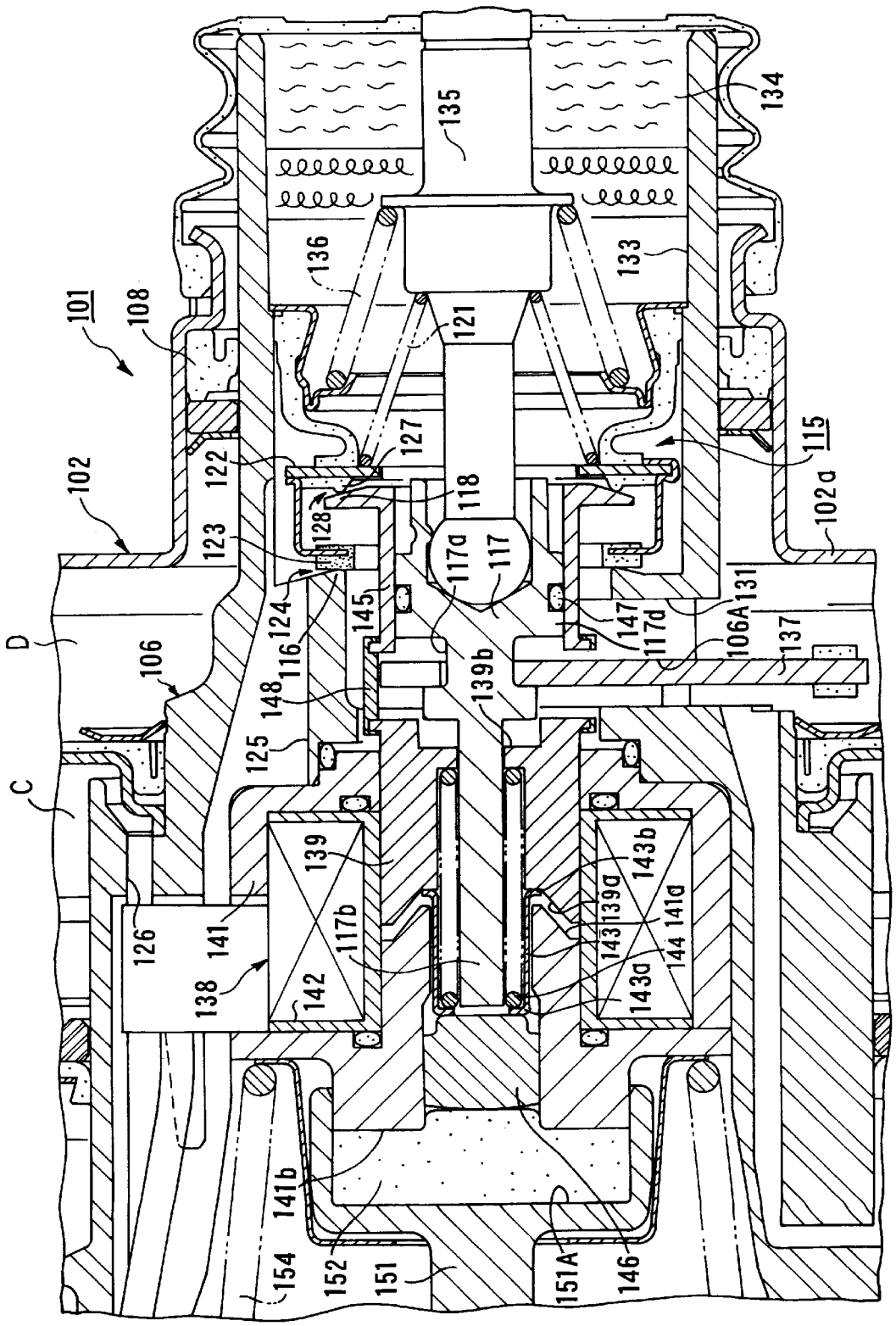

BRAKE BOOSTER

FIELD OF THE INVENTION

The invention relates to a brake booster, and more particularly, to a brake booster which also functions as an automatic brake.

DESCRIPTION OF THE PRIOR ART

A brake booster which is capable of functioning as an automatic brake is known in the art, as disclosed in Japanese Laid-Open Patent Application No.31,050/1991. The disclosed brake booster includes a solenoid disposed within a valve body, and is arranged so that a valve mechanism is operated as the solenoid is energized. Specifically, in its inoperative condition, the brake booster has its atmosphere valve, which forms the valve mechanism, closed while a vacuum valve is open. When the solenoid which is disposed forwardly of the valve mechanism is energized under the inoperative condition, the vacuum valve is closed while the atmosphere valve is opened. This allows the atmosphere to be introduced into a variable pressure chamber of the brake booster, whereby the pressure differential between the atmospheric pressure within the variable pressure chamber and a negative pressure within the constant pressure chamber drives the valve body forward. In this manner, the brake booster is actuated without depressing a brake pedal. In other words, the brake booster functions as an automatic brake.

In the conventional brake booster mentioned above, the atmosphere valve remains open when the solenoid is energized, and accordingly, an output from the brake booster sharply increases up to a maximum output which is determined by the diameter of a power piston. Accordingly, if a controller which controls the energization of the solenoid fails and the solenoid is inadvertently operated, the brake booster would be operated as an automatic brake independently from the intent of a driver, resulting in the likelihood that a quick braking action may be applied suddenly.

SUMMARY OF THE INVENTION

In view of the foregoing, the invention provides an improvement of a brake booster including a substantially tubular valve body slidably disposed within a shell, a power piston mounted on the valve body, a constant and a variable pressure chamber defined across the power piston, a vacuum valve disposed within the valve body for switching a communication between the constant and the variable pressure chamber, an atmosphere valve disposed within the valve body for switching a communication between the variable pressure chamber and the atmosphere, a valve plunger disposed within the valve body in a movable manner and coupled to an input shaft to open/close the vacuum valve and the atmosphere valve, a tubular member disposed within the valve body in a movable manner for opening/closing the vacuum valve and the atmosphere valve, a drive mechanism disposed within the valve body for moving the tubular member, and a reaction disc for transmitting a reaction from an output to the valve plunger as the valve body is driven forward. In accordance with the invention, the improvement comprises providing output restriction means which restricts an increase in the output by closing the atmosphere valve in accordance with an increase in the output whenever the drive mechanism moves the tubular member to its operative position to close the vacuum valve and open the atmosphere valve.

With this arrangement, when the drive mechanism moves the tubular member to its operative position under the inoperative condition when a brake pedal is not depressed or when the vacuum valve is open while the atmosphere valve is closed, the vacuum valve is closed while the atmosphere valve is opened, whereby the atmosphere is introduced into the variable pressure chamber to drive the valve body forward, operating the brake booster as an automatic brake.

As the valve body is driven forward, an output from the brake booster increases, but the output restriction means operates to close the atmosphere valve to thereby cease a rise in the output, thus restricting an increase in the output. In other words, the output which is reached at this time represents a maximum output when operating the tandem brake booster as an automatic brake. Thus, an output from the tandem brake booster when it is operated as an automatic brake will be less than a maximum output which is determined by the diameter of the power piston.

Accordingly, if the drive mechanism inadvertently moves the tubular member to its operating position and the brake booster is inadvertently operated as an automatic brake, the maximum output from the brake booster will be a reduced output as mentioned above. In this manner, in the event the brake booster is inadvertently operated as an automatic brake, it is assured that a quick braking action cannot be applied, thus enhancing the safety as compared with the prior art.

Above and other objects, features and advantages of the invention will become apparent from the following description of several embodiments thereof with reference to the attached drawings.

BRIEF DESCRIPTION OF THE DRAWINGS

FIG. 8 is a cross section of the arrangement shown in FIG. 6 during a different phase of operation from the phase shown in FIG. 7 when it is operated as an automatic brake.

DETAILED DESCRIPTION OF THE EMBODIMENTS

Figure 1:
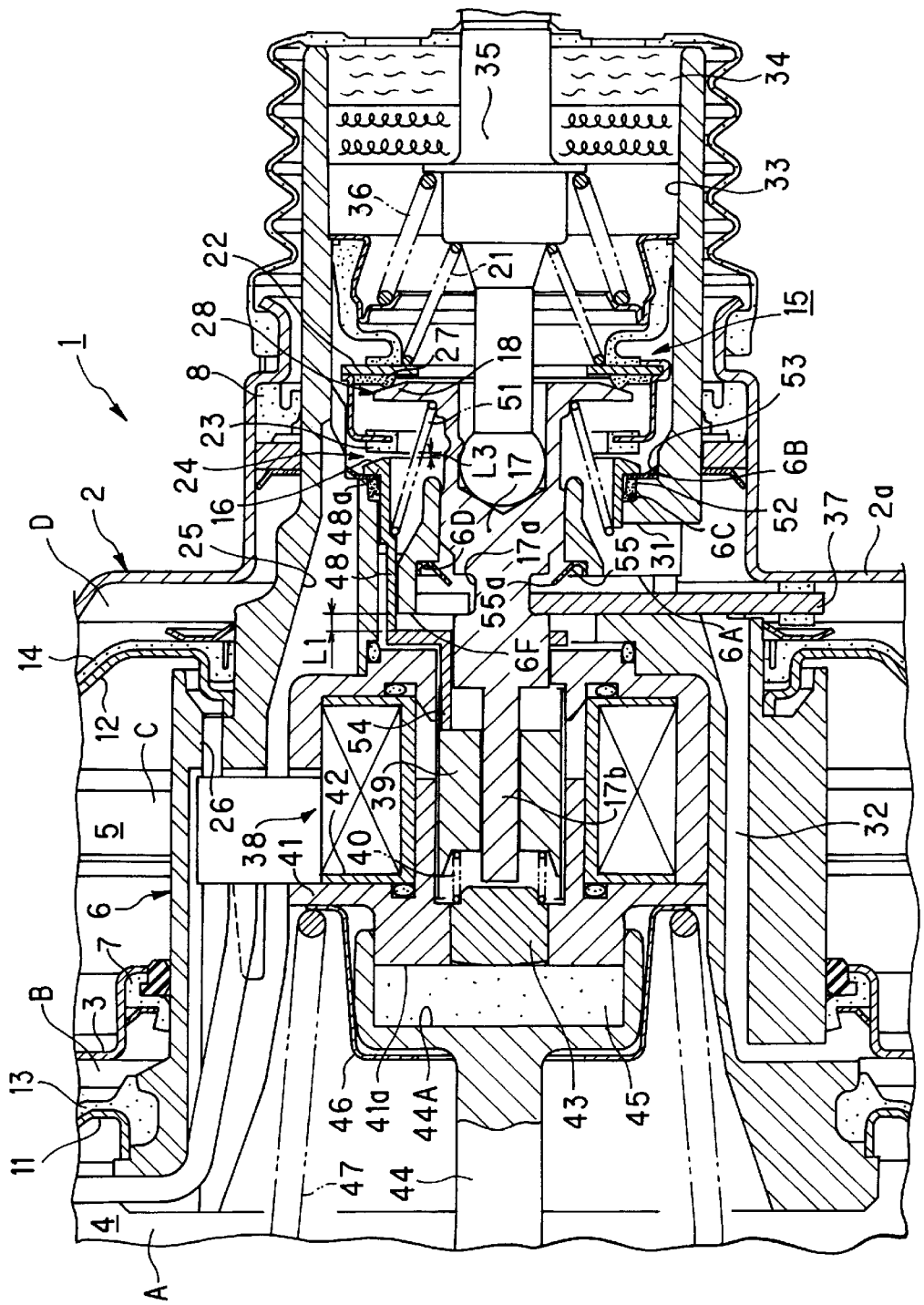
FIG. 1 is a cross section of a first embodiment of the invention.

Several embodiments of the invention will now be described with reference to the drawings. Initially referring to FIGS. 1 and 2, a tandem brake booster 1 includes a shell 2, the interior of which is partitioned into a forwardly located front chamber 4 and a rearwardly located rear chamber 5 by a centerplate 3 which is centrally disposed therein. A tubular valve body 6 sidably extends through the inner periphery of the shell 2 at its rear or right end and through the inner periphery of the centerplate 3, with seal means 7, 8 being disposed thereat to maintain a hermetic seal.

A front power piston 11 and a rear power piston 12 are connected to the outer periphery of the valve body 6 at locations which are situated within the front chamber 4 and the rear chamber 5, respectively, and a front diaphragm 13 and a rear diaphragm 14 are applied to the back surfaces of the respective power pistons 11 and 12. The front diaphragm 13 partitions the interior of the front chamber 4 into a constant pressure chamber A and a variable pressure chamber B, and the rear diaphragm 14 partitions the interior of the rear chamber 5 into a constant pressure chamber C and the variable pressure chamber D.

A valve mechanism 15 which switches a communication between the constant pressure chambers A, C and the variable pressure chambers B, D and a communication between the variable pressure chambers B, D and the atmosphere is disposed within the valve body 6. Specifically, the valve mechanism 15 comprises an annular vacuum valve seat 16 disposed on the valve body 6 in a movable manner, an annular atmosphere valve seat 18 formed on the right end of a valve plunger 17 which is slidably fitted into the valve body 6 so as to extend through the vacuum valve seat 16, and a valve element 22 urged by a spring 21 from the rear side, as viewed in FIG. 1, so as to be seated upon either valve seat 16, 18.

A combination of the vacuum valve seat 16 and a first seat area 23 on the valve element 22 which moves into engagement with or disengagement from the valve seat 16 defines a vacuum valve 24. A space located radially outward of the vacuum valve 24 communicates with the constant pressure chamber A through a first constant pressure passage 25 formed in the valve body 6, and the constant pressure chamber A communicates with the constant pressure chamber C through a second constant pressure passage 26. It is to be understood that the constant pressure chamber A is maintained in communication with a source of negative pressure through a tubing (not shown) which introduces a negative pressure, whereby the negative pressure is normally introduced into the constant pressure chambers A and C.

A combination of the atmosphere valve seat 18 and a second seat area 27 on the valve element 22 which moves into engagement with or disengagement from the valve seat 18 defines an atmosphere valve 28. A space located between the second seat area 27 and the first seat area 23 communicates with the variable pressure chamber D through a radially extending, first variable pressure passage 31 formed in the valve body 6, and the variable pressure chamber D in turn communicate with the variable pressure chamber B through a second variable pressure passage 32 formed in the valve body 6. It is to be noted that the diameters of the second seat area 27 and the first seat area 23 are substantially equal to each other, and accordingly, the vacuum valve 24 and the atmosphere valve 28 have substantially equal diameters.

A space located radially inward of the atmosphere valve 28 communicates with the atmosphere through an atmosphere passage 33 formed in the valve body 6 and through a filter 34 disposed therein.

The rear end of the valve plunger 17 is pivotally connected with a distal end of an input shaft 35, and a spring 36 having a greater resilience than the spring 21 is disposed between the input shaft 35 and the valve body 6, thus causing the second seat area 27 on the valve element 22 to be seated on the atmosphere valve seat 18 to close the atmosphere valve 28 in the inoperative condition of the tandem brake booster 1 shown in FIG. 1 while causing the first seat area 23 on the valve element 22 to move away from the vacuum valve seat 16 to open the vacuum valve 24 (FIG. 1). The other end of the input shaft 35 is coupled to a brake pedal, not shown, for movement therewith. In the inoperative condition mentioned, all of the chambers A, B, C and D communicate with each other, and the negative pressure is introduced in the respective chambers A, B, C and D.

A radial opening 6A is formed in the valve body 6 at a location slightly forwardly of the first variable pressure passage 31, and a key member 37, which is known in itself, passes through the radial opening 6A to be engaged with an engaging portion 17a of a reduced diameter on the valve plunger 17, thus preventing the valve plunger 17 from being withdrawn rearwardly from the valve body 6.

The key member 37 is displaceable axially of the valve body 6 within the radial bore 6A, and the key member 37 and the valve plunger 17 are displaceable axially of the valve body 6 within the extent of the axial length of the engaging portion 17a.

When the tandem brake booster 1 shown in FIG. 1 is inoperative, the key member 37 abuts against a rear wall surface 2a of the shell 2 to maintain the key member 37 and the valve plunger 17 at advanced positions relative to the valve body 6, thus reducing a lost motion of the input shaft 35 at the commencement of operation of the tandem brake booster 1.

At a location forwardly of the radial bore 6A, a housing 41 for a solenoid 38 is hermetically fitted around the inner periphery of the valve body 6. The housing 41 is generally cylindrical and contains around its outer periphery a spool 42 carrying a coil winding.

A cylindrical piston 39 is slidably fitted into the inner periphery of the housing 41, and a front portion 17b of the plunger 17 which has a reduced diameter extends through the piston 39 from the rear side thereof. A plunger plate 43 is slidably fitted into the inner periphery of the housing 41 at a location forwardly of the piston 39, thus maintaining the rear end face of the plunger plate 43 in closely spaced and opposing relationship with the front end face of the portion 17b of a reduced diameter. A spring 40 is disposed between the plunger plate 43 and the opposing end face of the piston 39, whereby the plunger plate 43 and the piston 39 are urged to move away from each other.

An output shaft 44 is disposed forwardly of the housing 41 for the solenoid 38, and is formed at its one end with a recess 44A in which a reaction disc 45 is received. Under this condition, the recess 44A of the output shaft 44 is slidably fitted around the outer periphery of the housing 41 at its front end, thus causing the reaction disc 45 to abut against a front end face 41a of the housing 41. Accordingly, the reaction disc 45 opposes the front end face of the plunger plate 43 which is disposed adjacent to and rearward of the reaction disc 45. Said one end of the output shaft 44 is covered by a cup-shaped retainer 46 which is fitted from the front side, and a flange-like outer periphery of the retainer 46 abuts against a stepped end face of the housing 41. A return spring 47 is disposed between this outer periphery of the retainer 46 and the front wall surface of the shell 2, thereby maintaining the valve body 6 and other members in their inoperative positions shown in FIG. 1.

The other end or the front end of the output shaft 44 projects externally through the front wall surface of the shell 2 for connection with a piston of a master cylinder, not shown.

In the present embodiment, the vacuum valve seat 16 is disposed to be movable axially with respect to the valve body 6, and an arrangement is made to operate the tandem brake booster 1 without depressing a brake pedal, by energizing the solenoid 38.

Specifically, the inner periphery of the valve body 6 is provided with a stepped end face 6B which faces rearward at a location forwardly of the valve element 22, defining a substantially annular space inward of the stepped end face 6B which extends axially forward. A first tubular member 48 is slidably fitted into this space from the rear side, and the rear end of the first tubular member 48 is formed with a flange 48*a* which extends radially outward with an increased diameter. The inner peripheral edge of the flange 48*a* defines the vacuum valve seat 16.

The first tubular member 48 also includes a front portion which has a reduced diameter as compared with its rear portion, thereby defining a step in the inner periphery of the first tubular member 48, and a spring 51 is disposed between this step and the outer periphery of the valve plunger 17 which is located axially rearward, thus normally urging the first tubular member 48 in the forward direction.

An annular recess 6C is formed in the stepped end face 6B, and is fitted with an annular seal member 52, and an annular retainer 53 is then disposed as a press fit into the inner periphery of the valve body 6 for abutment against the stepped end face 6B, thereby preventing the annular seal member 52 from being withdrawn rearwardly from the annular recess 6C.

Because the inner periphery of the annular seal member 52 is tightly in contact with the outer periphery of the first tubular member 48, the annular seal member 52 is effective to maintain a hermetic seal between the outer periphery of the first tubular member 48 and the inner periphery of the valve body 6.

The solenoid 38 is of a type which is on- and off-controlled by a controller, not shown. When the solenoid 38 is energized by the controller, the piston 39 is urged rearward.

A second tubular member 54 is disposed between the piston 39 associated with the solenoid 38 and the first tubular member 48, and at its front end, the outer periphery of the second tubular member 54 is slidably fitted into the inner periphery of the housing 41. On the other hand, the rear end of the second tubular member 54 is formed with a flange, which is slidably fitted into the inner periphery of the valve body 6 while opposing the front end of the first tubular member 48. It will be noted that the second tubular member 54 is slidably fitted around the outer periphery of the valve plunger 17 which is disposed forwardly of the key member 37.

As mentioned previously, the first tubular member 48 is urged in the forward direction by the spring 51 while the piston 39 is urged in the rearward direction by the spring 40 which is disposed between the piston and the plunger plate 43. Accordingly, the axial ends of the second tubular member 54 are held sandwiched between the piston 39 and the first tubular member 48, and hence, as the piston 39 is axially driven, the second tubular member 54 and the first tubular member 48 are also axially driven in response thereto.

The resilience of the spring 40 is chosen to be less than the resilience of the spring 51, and accordingly, in the inoperative condition as shown in FIG. 1 when the solenoid 38 is not energized and a brake pedal, not shown, is not depressed, the resilience of the spring 51 is effective to maintain the flange 48*a* of the first tubular member 48 at its advanced end position (inoperative position) where it abuts against the retainer 53. Hence, as mentioned previously, the vacuum valve seat 16 provided on the first tubular member 48 is spaced from the first seat area 43 on the valve element to open the vacuum valve 24. The resilience of the spring 40 is effective to maintain the plunger plate 43 in light abutment against the reaction disc 45. At this time, a very small clearance is maintained between the front end face of the valve plunger 17 and the plunger plate 43.

Figure 2:
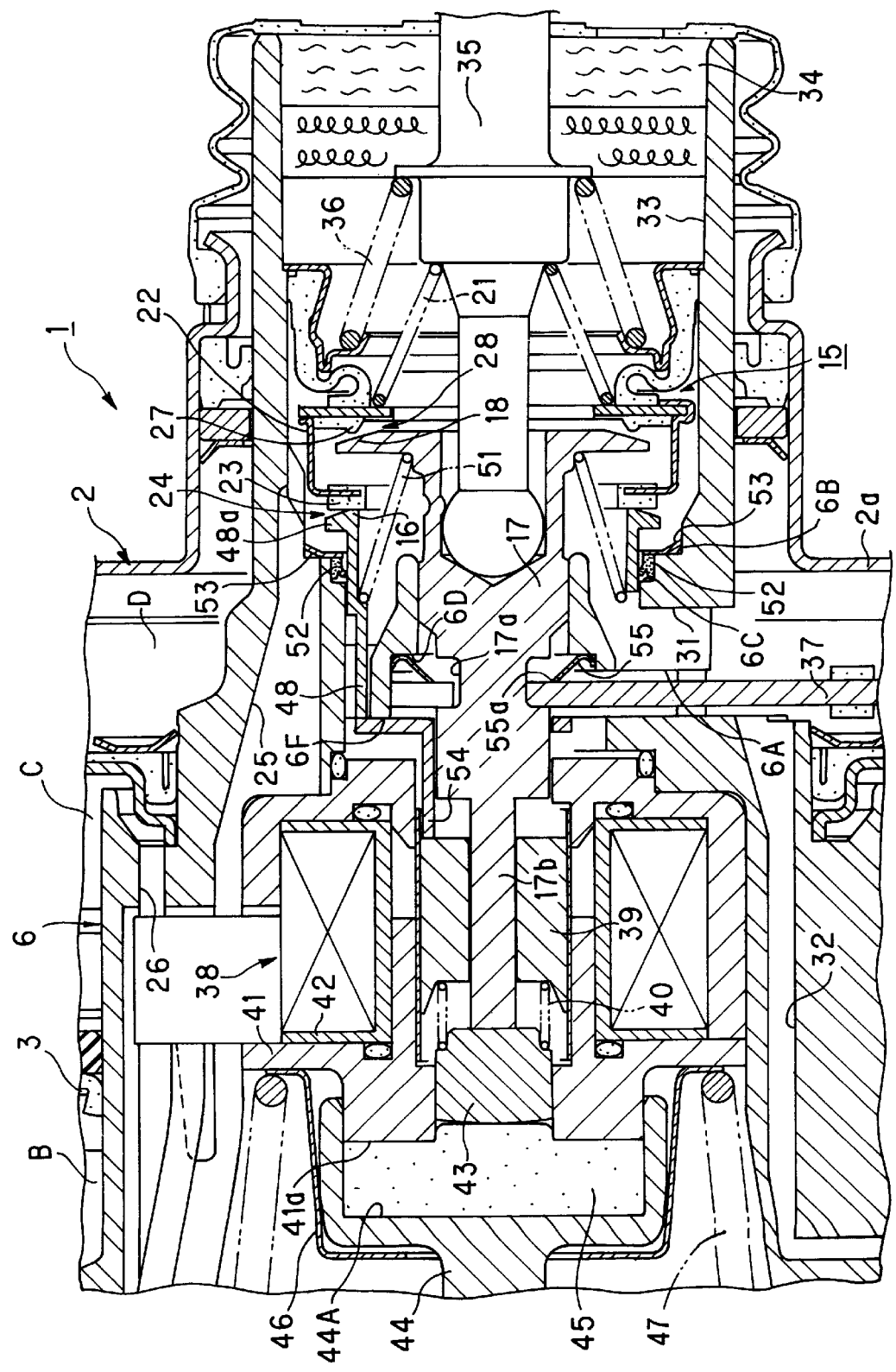
FIG. 2 is a cross section of the arrangement shown in FIG. 1 when it is operated as an automatic brake.

In the present embodiment, the first tubular member 48 is moved to its operative position shown in FIG. 2 when the solenoid 38 is energized, whereby the vacuum valve seat 16 formed on the first tubular member 48 becomes seated on the first seat area 23 to close the vacuum valve 24. In addition, in the present embodiment, an arrangement is made such that under the condition that the first tubular member 48 assumes its operative position shown in FIG. 2, the second seat area 27 on the valve element 22 can be seated upon the atmosphere valve seat 18 formed on the valve plunger 17. In other words, when the first tubular member 48 assumes its operative position, not only the vacuum valve 24, but the atmosphere valve 28 can also be closed.

An annular recess 6D is formed around the inner periphery at the rear end face of the radial bore 6A in the valve body 6, and the outer periphery of an annular spring 55 is fitted in this recess. The spring 55 is in the form of Belleville spring including a radial portion which is tapered so that the diameter is reduced toward the front, with its front end 55*a* which defines its inner peripheral edge being located forwardly of the rear end face of the radial bore 6A. Under the inoperative condition of the tandem brake booster 1 as shown in FIG. 1, the key member 37 abuts against the wall surface 2*a* of the shell 2, and the valve plunger stays at rest with the front end face of the engaging portion 17*a* abutting against the key member 37. At this time, the front end 55*a* of the spring 55 is spaced from the rear end face of the key member 37 by an amount which corresponds to one-half the thickness of the key member 37.

As mentioned above, in the present embodiment, an arrangement is made such that when the first tubular member 48 is positioned at its operative position, the vacuum valve 24 is closed, and the second seat area 27 on the valve element 22 can be seated upon the atmosphere valve seat 18 formed on the valve plunger 17. Accordingly, when the first tubular member 48 is moved from its inoperative position shown in FIG. 1 to the operative position shown in FIG. 2, the vacuum valve 24 is closed, and after the atmosphere valve 28 is once opened, the second seat area 27 on the valve element 22 tends to seat on the atmosphere valve seat 18 formed on the valve plunger 17. As the atmosphere valve 28 is opened, the valve body 6 is driven forward, whereupon the front end 55*a* of the spring 55 disposed on the valve body 6 abuts against the key member 37, thus temporarily preventing the second seat area 27 on the valve element 22 from becoming seated upon the atmosphere valve seat 18 on the valve plunger 17.

In this manner, by maintaining the atmosphere valve 28 open, an output from the tandem brake booster 1 increases, and concomitantly, the reaction from the output causes the reaction disc 45 to bulge rearward, causing the plunger plate 43 to abut against the valve plunger 17. As the amount of bulge of the reaction disc 45 in the rearward direction increases, the spring 55 is axially compressed to move the valve plunger 17 rearward relative to the valve body 6. Concomitantly, the second seat area 27 on the valve element 22 becomes seated upon the atmosphere valve seat 18 on the valve plunger 17, thus closing the atmosphere valve 28. This means that at this point, not only the vacuum valve 24, but the atmosphere valve 28 is also closed to achieve a servo balance condition where the output is maintained constant. With the described arrangement, a maximum output from the tandem brake booster 1 when it is operated as an automatic brake without depressing a brake pedal is less than a maximum output obtained during a normal braking operation in which a brake pedal is depressed to actuate the tandem brake booster 1. Thus it will be seen that the spring 55 in the present embodiment functions as output restriction means which causes an increase in the output from the tandem brake booster 1 to be ceased when the booster 1 is operated as an automatic brake.

Figure 3:
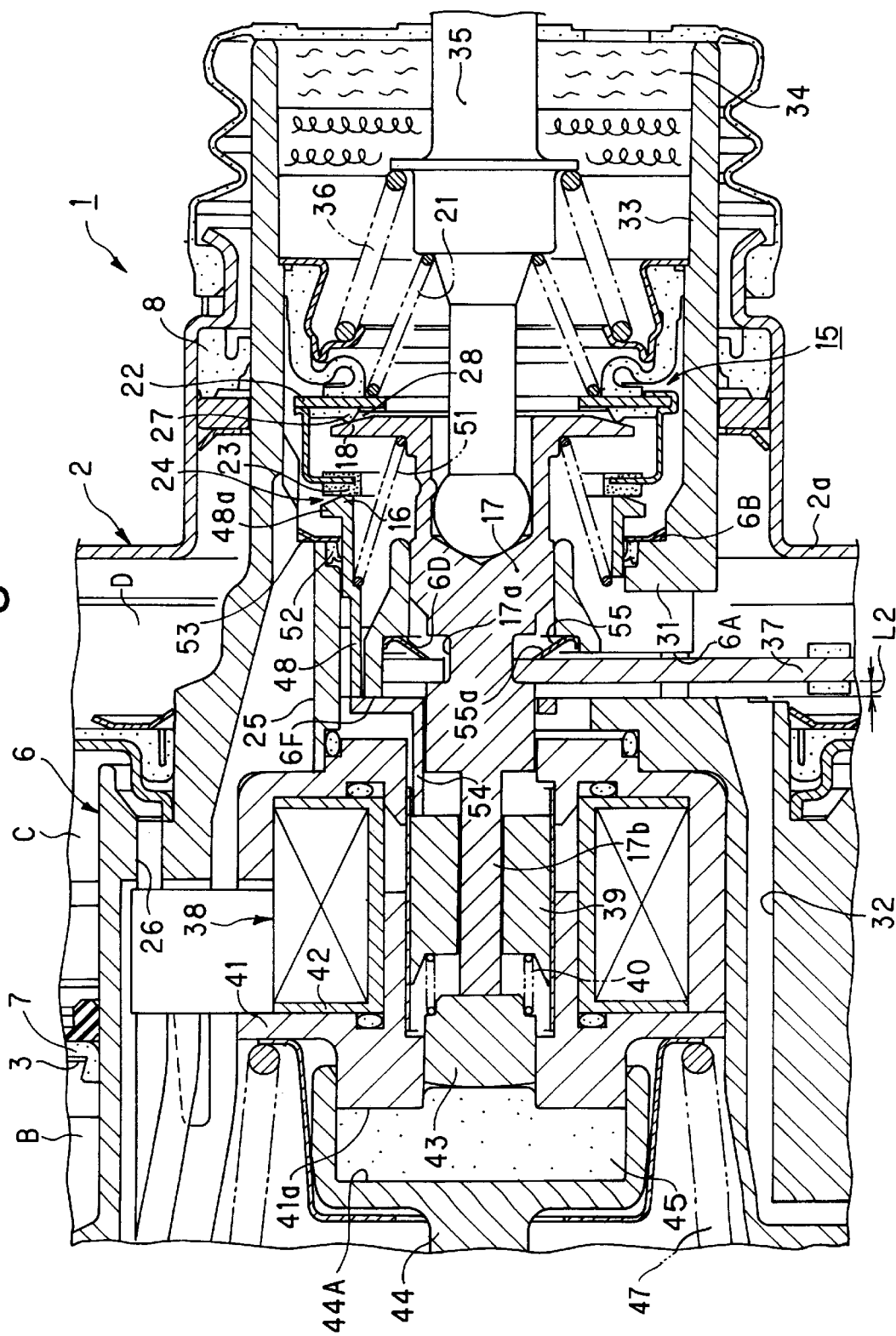
FIG. 3 is a cross section of the arrangement shown in FIG. 1 when it is operated as an automatic brake during a differing phase of operation from the phase illustrated in FIG. 2.

A stroke L1 over which the first tubular member 48 is moved rearward relative to the valve body 6 from its inoperative position shown in FIG. 1 to its operative position shown in FIGS. 2 and 3 as the solenoid 38 is energized is determined by a spacing of the rear end of the second tubular member 54 from its opposing stepped end face 6F of the valve body 6 in the inoperative position shown in FIG. 1. A stroke L2 (FIG. 3) over which the valve plunger can be moved rearward relative to the valve body 6 is determined by a distance by which the rear end face of the key member 37 is spaced from the end 55a of the spring 55 which is spaced therefrom, added with a distance corresponding to the elastic deformation of the spring 55 as it is axially compressed to its limit by the abutment of the key member 37 against the spring 55. A distance between the vacuum valve seat 16 formed on the first tubular member 48 which assumes its inoperative position and the first seat area 23 on the valve element 22 under the inoperative condition of the tandem brake booster 1 as shown in FIG. 1 in which the solenoid 38 is not energized is denoted by L3.

According to the present embodiment, when the first tubular member 48 is moved to its operative position shown in FIG. 2 to operate the tandem brake booster 1 as an automatic brake, an output from the brake booster can be increased gradually during a transition in which the spring 55 is compressed by the abutment of the key member 37 from a condition in which L1>L2+L3 to a condition L1≦L2+L3, or until the atmosphere valve 28 is closed to achieve a servo balance condition. In other words, an output which is obtained under the servo balance condition can be restricted to a small value.

Operation

With the described arrangement, in the inoperative condition shown in FIG. 1 in which the solenoid 38 is not energized and a brake pedal, not shown, is not depressed, the flange 48a of the first tubular member 48 is maintained in its inoperative position where it abuts against the retainer 43. Accordingly, the vacuum valve seat 16 is spaced from the first seat area 23 on the valve element 22 to open the vacuum valve 24 while the second seat area 27 on the valve element 22 is seated upon the atmosphere valve seat 18 to close the atmosphere valve 28. Under this inoperative condition, the resilience of the spring 51 is effective to maintain the front end of the valve plunger 17 to be slightly spaced from the rear end face of the plate plunger 43. The front end face of the plunger plate 43 lightly abuts against the reaction disc 45. The chambers A, B, C and D communicate with each other, and the negative pressure is introduced into these chambers.

When a brake pedal, not shown, is depressed under the inoperative condition shown in FIG. 1, the input shaft 35 and the valve plunger 17 are driven in the forward direction, whereby the first seat area 23 on the valve element 22 is initially seated upon the vacuum valve seat 16 to close the vacuum valve 24, followed by a movement of the atmosphere valve seat 18 away from the second seat area 27 on the valve element to open the atmosphere valve 28. This blocks a communication between the both constant pressure chambers A, C and the both variable pressure chambers B, D, and the atmosphere is introduced into the both variable pressure chambers B, D. The pressure differential between the negative pressure within the both constant pressure chambers A, C and the atmospheric pressure within the both variable pressure chambers B, D is effective to drive the both power pistons 11, 12 and the valve body 6 or the like in the forward direction. The tandem brake booster 1 is actuated in this manner, and a reaction from the output which acts on the output shaft 44 causes the reaction disc 45 to be compressed, whereby its axial portion bulges rearwardly. Accordingly, the spring 40 is compressed to cause the plunger plate 43 to move rearwardly toward the valve plunger 17, thus providing an abutment between the ends of the plunger plate 43 and the valve plunger 17. Accordingly, from this time on, a reaction from the output acting on the output shaft 44 is transmitted to a driver through the valve plunger 17 and the input shaft 35.

When the driver releases the brake pedal from the depression under the operative condition, the return spring 47 causes the valve body 6 and other members to be returned to their original inoperative positions shown in FIG. 1.

The normal operation of the tandem brake booster 1 takes place in the manner mentioned above. In other words, as long as the solenoid 38 is not energized, the first tubular member 48 is positioned at its advanced end (inoperative position) where it abuts against the retainer 53. As long as the solenoid 38 is not energized, the operation remains the same as in the conventional tandem brake booster in which an annular vacuum valve seat (corresponding to the valve seat 16) is integrally formed on the inner peripheral edge of the stepped end face 6B of the valve body 6. During the normal operation of the tandem brake booster 1, the output from the tandem brake booster 1 increases to a maximum output which is determined by the diameters of the both power pistons (11, 12) in the similar manner as in the prior art.

Operation as an Automatic Brake

When the tandem brake booster 1 is to be operated as an automatic brake in contrast to the normal braking operation, the solenoid 38 is energized by an associated controller under the inoperative condition shown in FIG. 1 without depressing a brake pedal, not shown.

This causes the piston 39 and its associated both tubular members 48, 54 to be moved rearward against the resilience of the springs 51, 21. Accordingly, the flange 48a of the first tubular member 48 moves away from the retainer 53 and moves rearward to its operative position shown in FIG. 2. Concomitantly, the vacuum valve seat 16 formed on the first tubular member 48 becomes seated on the first seat area 23 on the valve element 22 to close the vacuum valve 24 while the second seat area 27 on the valve element 22 moves away from the atmosphere valve seat 18 formed on the valve plunger 17 to open the atmosphere valve 28 (FIG. 2). This allows the atmosphere to be introduced into the both variable pressure chambers B, D, developing a pressure differential between the atmospheric pressure within the both variable pressure chambers B, D and the negative pressure within the both constant pressure chambers A, C which is effective to drive the both power pistons 11, 12 and the valve body 6 to the left, thus actuating the tandem brake booster. In this manner, it functions as an automatic brake without depressing a brake pedal.

It is to be understood that the present embodiment is arranged such that when the first tubular member 48 is moved to its operative position, the second seat area 27 on the valve element 22 can be seated upon the atmosphere valve seat 18 formed on the valve plunger 17. Accordingly, the second seat area 27 on the valve element 22 which moves forwardly together with the valve body 6 tends to become seated upon the atmosphere valve seat 18 formed on the valve plunger 17 which remains stationary. However, the end 55a of the spring 55 abuts against the key member 37, and thus prevents the second seat area 27 on the valve element 22 from seating upon the atmosphere valve seat 18 on the valve plunger 17 (FIG. 2). In other words, the atmosphere valve 28 is maintained open, and thus an output from the tandem brake booster 1 which is functioning as an automatic brake rises.

As the output rises, a reaction from the output causes the reaction disc 45 to be compressed, whereby its axial portion bulges rearward. Accordingly, the plunger plate 43 abuts against the valve plunger 17, and subsequently as the reaction disc 45 bulges further rearward, the spring 55 which functions as the output restriction means is axially compressed, causing the key member 37 and the valve plunger 17 to be moved rearward with respect to the valve body 6 and the valve element 22. This causes the atmosphere valve seat 18 to be seated on the second seat area 27 to close the atmosphere valve 28. This means that at this point in time, the vacuum valve 24 and the atmosphere valve 28 are both closed to achieve a servo balance condition, whereupon an increase in the output from the tandem brake booster 1 which is functioning as an automatic brake ceases, subsequently maintaining the output which then prevails. It is to be noted that the prevailing output is reduced as compared with the output which obtains during a normal brake operation.

As mentioned above, according to the present embodiment, the output from the tandem brake booster 1 which is operated as an automatic brake can be suppressed low by the spring 55 which serves as output restriction means.

Accordingly, if the controller fails and causes the solenoid 38 to be operated inadvertently, a maximum output from the tandem brake booster 1 which is operated as an automatic brake is restricted to a low value. In this manner, a quick braking action which would occur when the solenoid 38 is operated inadvertently and independently from the intent of a driver is avoided, allowing a gentle braking action to be obtained and improving a safeguard against the inadvertent operation of the solenoid 38.

Because the brake booster of the present embodiment has its output suppressed low when it is operated as an automatic brake and because the output is allowed to increase gradually with the elastic deformation of the spring 55, the brake booster is preferred for use where a start and a stop are repeated because of congested road traffic. It is also preferred for use as an automatic brake during a cruise control. It is to be noted that the spring 55 may be replaced by an annular rubber.

Second Embodiment

Figure 4:
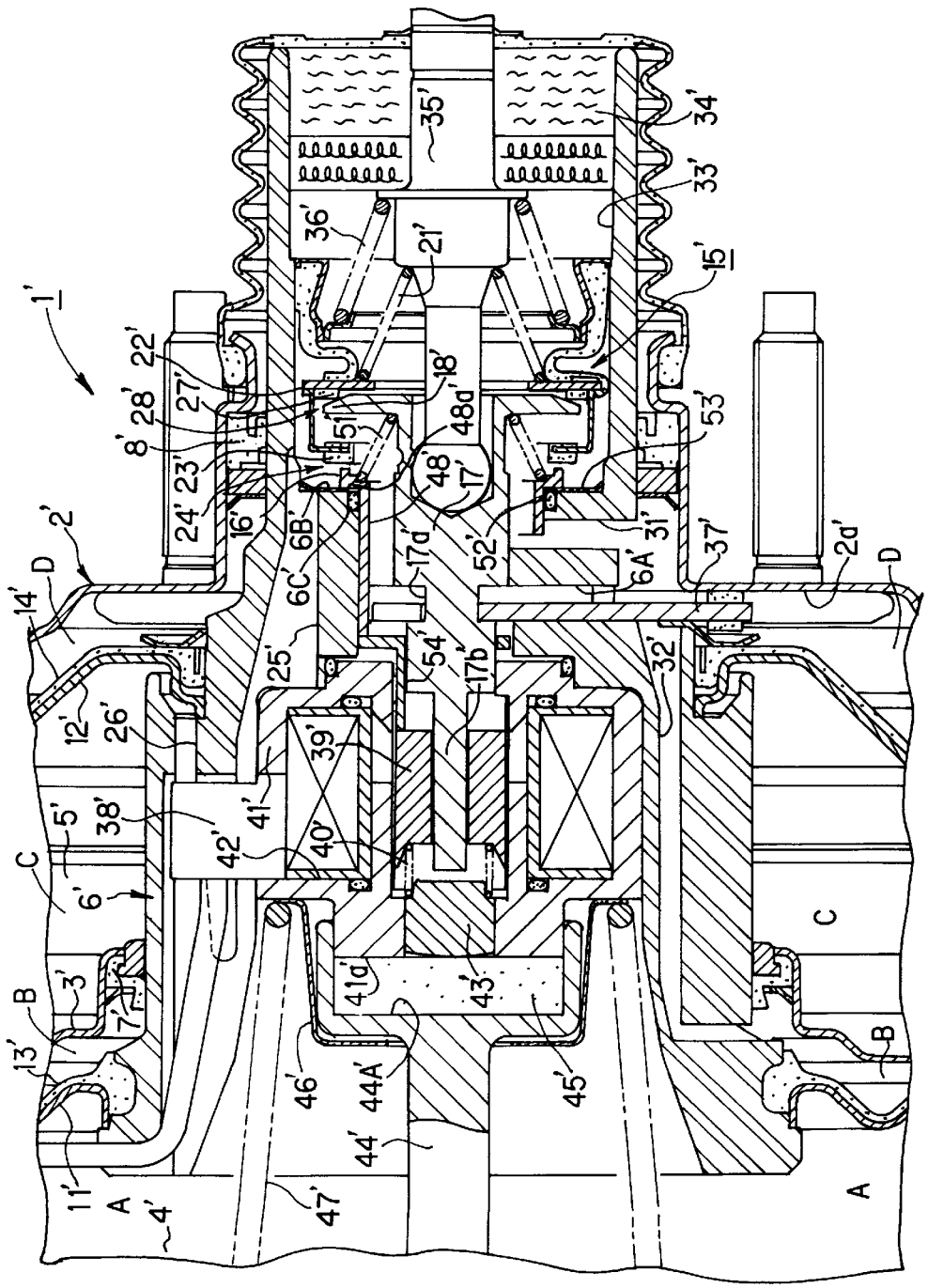
FIG. 4 is a cross section of a second embodiment of the invention.
Figure 5:
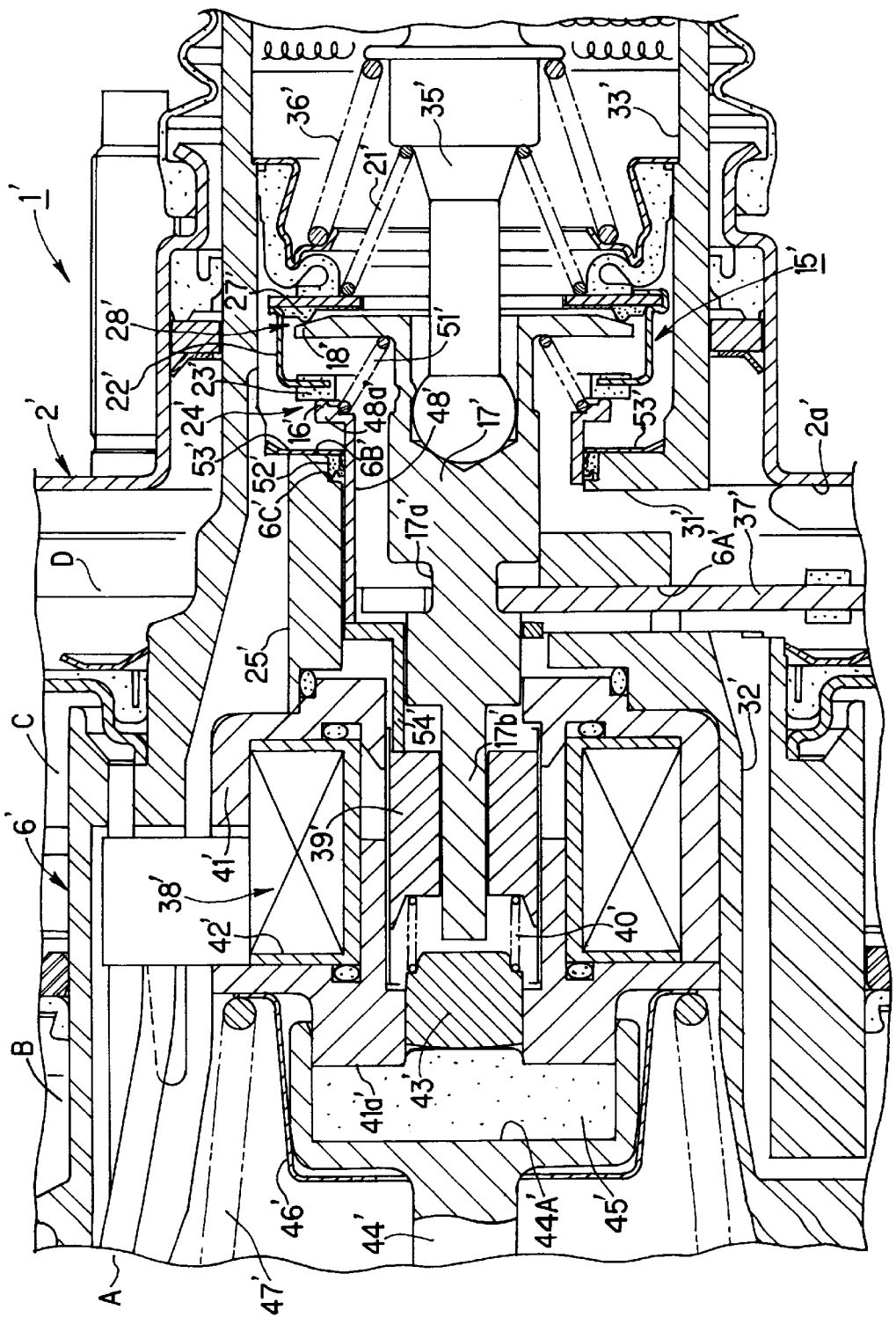
FIG. 5 is a cross section of the arrangement shown in FIG. 4 when it is operated as an automatic brake.

FIGS. 4 and 5 show a second embodiment of the invention where the spring 55 shown in connection with the first embodiment is omitted and the diameters of vacuum valve 24' and atmosphere valve 28' are changed.

Specifically, in the second embodiment, the spring 55, the annular recess 6D and the stepped end face 6F of the valve body shown in connection with the first embodiment are omitted. An annular projection is formed around the outer peripheral edge of the flange 48a' of a first tubular member 48' at its rear end to define a vacuum valve seat 16'. A spring 51 is disposed between a step formed around the inner periphery of the flange 48a' of the first tubular member 48' and the outer periphery of a valve plunger 17'.

In the second embodiment, the vacuum valve seat 16' (vacuum valve 24') has a diameter which is less than the diameter of an atmosphere valve seat 18' (atmosphere valve 28'). In addition, an annular seal member 52' has an internal diameter which is less than the diameter of the vacuum valve seat 16'.

In addition, in the second embodiment, a solenoid 38' has a coil which is energized with a variable current. Accordingly, by changing the current level which is used to energize the coil, the force with which a piston 39' is urged rearward can be regulated in a stepless manner.

In the second embodiment, when the solenoid 38' is energized to operate a tandem brake booster 1' as an automatic brake, closing the vacuum valve 24' is effective to achieve a balance between the force with which the piston 39' and the first tubular member 48' are urged rearward and the pressure differential between the inside and the outside of a valve body 22' and acting to urge it forwardly. In other words, in the second embodiment, a combination of the vacuum valve 24' and the atmosphere valve 28', the dimensions of which are chosen in the manner mentioned above as well as the tubular member 48', tubular member 54', plunger plate 43' and the solenoid 38' constitutes together output restriction means which is operative when the tandem brake booster 1' is operated as an automatic brake.

Operation

With the described arrangement, the operation which occurs during a normal operation of the tandem brake booster 1' as a brake pedal is depressed while the solenoid 38' is not energized (FIG. 5) remains the same as the operation of the first embodiment mentioned above. Accordingly, the operation of the tandem brake booster 1' when a brake pedal is normally depressed will not be described.

Operation as an Automatic Brake

By contrast, when the tandem brake booster 1' is to be operated as an automatic brake, a brake pedal, not shown, is not depressed, but a controller, not shown, passes a required current through the solenoid 38' under the inoperative condition shown in FIG. 4, thus energizing it.

In response thereto, the piston 39' is moved rearward against the resilience of springs 51', 21' with a force which depends on the magnitude of the current . Accordingly, a flange 48a' of the first tubular member 48' moves away from a retainer 53' and rearward (FIG. 2). Concomitantly the vacuum valve seat 16' formed on the first tubular member 48' becomes seated on a first seat area 23' on a valve element 22' to close the vacuum valve 24' while a second seat area 27' on the valve element 22' moves away from the atmosphere valve seat 18' formed on the valve plunger 17' to open the atmosphere valve 28'. This allows the atmosphere to be introduced into both variable pressure chambers B, D, whereupon a pressure differential is developed to drive both power pistons 11', 12' and a valve body 6' to the left, thus actuating the tandem brake booster 1'. In this manner, a function of an automatic brake is obtained without depressing a brake pedal.

When the tandem brake booster 1' is operated as an automatic brake, the atmospheric pressure within the both variable pressure chambers B, D is acting not only on the inside of the valve body 22', but also on the inside of the first tubular member 48'. At the same time, the negative pressure within the constant pressure chambers A, C is acting around the outer periphery of the first tubular member 48' which is positioned rearward of the retainer 53' and on the outside of the valve element 22'. It is to be noted that in the present embodiment, an annular seal member 52' has an internal diameter which is chosen to be less than the diameter of the atmosphere valve 28'. Accordingly, a pressure differential between the negative pressure acting radially outward of the closed vacuum valve 24' and the atmosphere within the variable pressure chambers B, D which acts inside the valve element 22' located rearward of the vacuum valve 24' causes the first tubular member 48', the second tubular member 54' and piston 39' to be pushed back against the force from the solenoid 38' which urges the piston 39' rearward. When the force from the solenoid 38' which urges the piston 39' rearward is balanced with a force from the pressure differential which acted to push back the first tubular member 48 forwardly, the second seat area 27' is seated upon the atmosphere valve seat 18' to close the atmosphere valve 28' also, as shown in FIG. 5. This achieves a servo balance condition, and the tandem brake booster 1' which is operated as an automatic brake obtains a required output.

In other words, also in the second embodiment, an output from the tandem brake booster 1' which is operated as an automatic brake can be suppressed low. Accordingly, a quick braking action which may occur as a result of an inadvertent energization of the solenoid 38' caused by a failure of a controller can be prevented, thus assuring a gentle braking action. In this manner, a safeguard against an inadvertent energization of the solenoid 38' can be improved.

In addition, in the second embodiment, the force with which the piston 39' is urged as the solenoid 38' is energized can be changed in a stepless manner in accordance with the magnitude of a current which is used to energize the solenoid 38'. Accordingly, an output from the tandem brake booster 1' which functions as an automatic brake can be freely regulated by suitably changing the magnitude of the current which is passed through the solenoid 38'.

Accordingly, with the second embodiment, an output from the tandem brake booster 1' which functions as an automatic brake can be more smoothly regulated than in the prior art.

Third Embodiment

Figure 6:
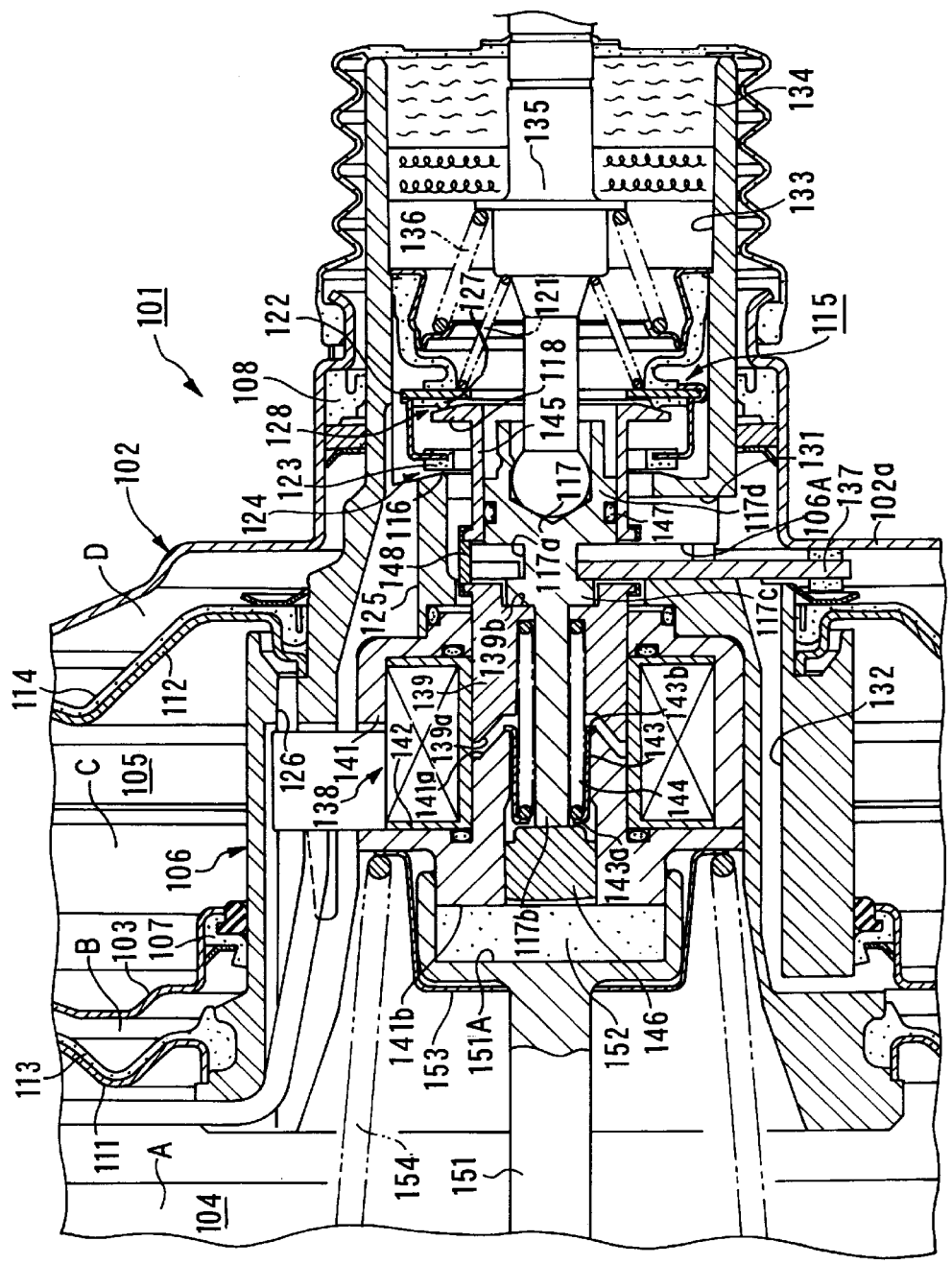
FIG. 6 is a cross section of a third embodiment of the invention.
Figure 7:
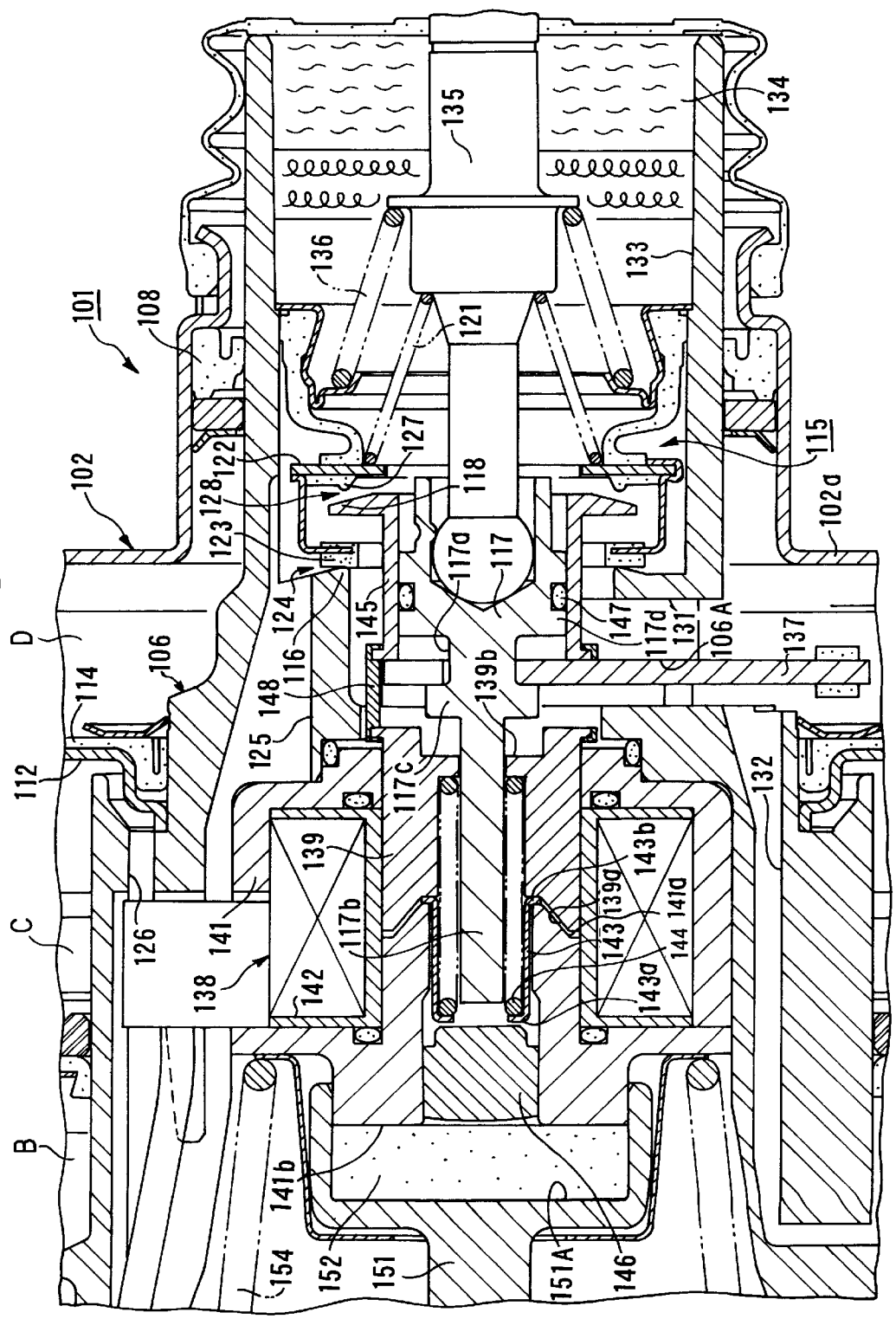
FIG. 7 is a cross section of the arrangement shown in FIG. 6 when it is operated as an automatic brake.

FIGS. 6, 7 and 8 show a third embodiment of the invention. In the first and the second embodiment, the vacuum valve seat 16 (16') is moved rearward relative to the valve body 6 (6'). By contrast, in the third embodiment, an arrangement is made to move an atmosphere valve seat 118 forwardly relative to a valve body 106 and an input shaft 135. In addition, the internal construction of a solenoid 138 is changed. It is to be noted that in the description of the third embodiment, parts corresponding to those shown in connection with the first embodiment are designated in principle by like numerals as used in the description of the first embodiment, to which 100 is added.

Construction of Solenoid

Specifically, referring to FIGS. 6 to 8, a housing 141 for the solenoid 138 has an inner periphery which has an increased diameter in its axially rear region than in its front portion. A cylindrical piston 139 is slidably fitted in the portion of an increased diameter.

A tapered surface 141a having a diameter which is reduced in the rearward direction is formed around the inner periphery of the housing 141 in a boundary region between a front portion of a reduced diameter and a rear portion of an increased diameter. On the other hand, the piston 139 has a front end face which is formed with a tapered surface 139a of a diameter which reduces in the rearward direction in conformity to the configuration of the tapered surface 141a. Thus, the tapered surface 141a of the housing 141 is closely spaced from and opposes the tapered surface 139a on the piston 139.

A cylindrical sleeve 143 is slidably fitted, from the rear side, into the inner periphery of the housing 141 in a region which is located forwardly of the tapered surface 141a. The sleeve 143 has a front end 143a which is folded radially inward to provide a stop, and has a rear end 143b which is folded radially outward to provide a flange-like stop. A coiled spring 144 is disposed between the front end 143a of the sleeve 143 and its opposing stepped end face of the piston 139. In this manner, when the solenoid 138 is not energized as shown in FIG. 6, the sleeve 143 is maintained at its advanced end position in which the rear end 143b thereof engages the rear end (inner peripheral edge) of the tapered surface 141a while the piston 139 is urged in the rearward direction. Accordingly, the rear end 143b of the sleeve 143 which is maintained at its advanced end position is spaced from the inner periphery of the tapered surface 139a of the piston 139.

In distinction to a conventional one, a valve plunger 117 of the present embodiment is not provided with an atmosphere valve seat 118 at its rear end as is formed in the prior art, but includes a front portion which is in the form of a stepped rod having a successively decreasing diameter. Concomitantly, the atmosphere valve seat 118 is formed on a tubular member 145 to be described later in the present embodiment. The valve plunger 117 includes a front portion of a reduced diameter 117b, a portion 117c of a medium diameter which follows the portion 117b, and a portion 117d of an increased diameter which follows the portion 117c of a medium diameter. An annular groove is formed in a rear portion of the portion 117c of a medium diameter to define an engaging portion 117a which is engaged by a key member 137. An input shaft 135 is pivotally connected to the axial portion of the valve plunger 117 at its rear end. The valve plunger 117 which is constructed in this manner has its front portion 117b of a reduced diameter disposed to extend through the piston 139, the coiled spring 144 and the sleeve 143 from the rear side thereof.

A plunger plate 146 is sidably fitted into the inner periphery of the housing 141 at a location adjacent to, but forwardly of the sleeve 143. Accordingly, in the inoperative condition of the tandem brake booster 101 shown in FIG. 6, the front end of the portion 117b of a reduced diameter of the valve plunger 117 (or the front end of the valve plunger 117) is in abutment against the plunger plate 146.

A tubular member 145 is slidably fitted, from the rear side, around the portion 117d of an increased diameter located at the rear end of the valve plunger 117. An annular seal member 147 is mounted in the portion 117d of an increased diameter of the valve plunger 117 to maintain a hermetic seal between the outer peripheral surface of the portion 117d of an increased diameter of the valve plunger 117 and the inner peripheral surface of the tubular member 145. The tubular member 145 has its rear end increased in diameter in the form of a flange, on which the atmosphere valve seat 118 is defined toward the outer periphery.

The front end of the tubular member 145 is integrally connected to the rear end of the piston 139 by a tubular connection member 148. In this manner, a given axial length is maintained between the atmosphere valve seat 118 and the tapered surface 139a of the piston 139. It is to be noted that a vacuum valve seat 116 is formed around the inner peripheral edge at a step of the valve body 106 in the similar manner as in the prior art.

In the present embodiment, a current of a variable magnitude is used to energize the coil of the solenoid 138 in the similar manner as in the second embodiment, and the energization of the solenoid 138 is controlled by a controller, not shown. When the solenoid 138 is energized, the piston 139 is moved forwardly relative to the housing 141 and the valve body 106, and the tubular member 145 (and hence the atmosphere valve seat 118) moves forwardly relative to the valve body 106 and the valve plunger 117 in an integral manner therewith. A notch is formed in the connection member 148 at its axial center, which permits the key member 137 to pass therethrough to extend into the engaging portion 117a of the valve plunger 117. The axially front edge of the notch is located to be coplanar with the rear end face of the piston 139 while the axially rear edge of the notch is located to be coplanar with the front end face of the tubular member 145. Thus, the axial size of the notch is chosen to be equal to the spacing between the rear end face of the piston 139 and the front end face of the tubular member 145, as viewed in FIG. 6.

On the other hand, an output shaft 151 is disposed forwardly of the housing 141 for the solenoid 138, and is formed at its one end with a recess 151A in which a reaction disc 152 is received. The recess 151A of the output shaft 151 with the reaction disc 152 received therein is slidably fitted around the outer periphery of the housing 141 at its front end, thus maintaining the reaction disc 152 in abutment against the front end face 141b of the housing 141. In this manner, the reaction disc 152 and the front end face of the plunger plate 146 which is located adjacent to, and rearward thereof oppose each other and are closely spaced from each other. Said one end of the output shaft 151 is covered by a cup-shaped retainer 153 from the front side, and the flange-like outer periphery of the retainer 153 is maintained in abutment against a stepped end face of the housing 141. A return spring 154 is disposed between the outer periphery of the retainer 153 and a front wall surface of the shell 1, thus normally maintaining the valve body 106 and related parts in their inoperative positions shown in FIG. 6. The front end of the output shaft 151 projects externally of the front wall of the shell 102, with its distal end being connected to a piston of a master cylinder, not shown.

Controller

As mentioned previously, the energization of the solenoid 138 is controlled by a controller. When the solenoid 138 is energized by the controller, the piston 139 is moved to its advanced end position where its tapered surface 139a abuts against the rear end 143b of the sleeve 143 which is maintained at its advanced position (FIG. 7).

Accordingly, when the solenoid 138 is energized under the inoperative condition of the tandem brake booster 101 as shown in FIG. 6 to move the piston 139 to its advanced end position, the tubular member 145 and the atmosphere valve seat 118 which are integrally connected to the piston 139 move to their forwardly located, operative positions relative to the valve plunger 117 and the valve body 106 (FIG. 7). As the tubular member 145 moves forwardly in this manner, a valve element 122 which is urged by a spring 121 moves forwardly together with the tubular member 145, whereby a first seat area 123 on the valve element 122 is initially seated on the vacuum valve seat 116 to close a vacuum valve 124. Subsequently, the tubular member 145 further moves to the operative position shown in FIG. 7, whereby the atmosphere valve seat 118 formed on the tubular member 145 moves away from a second seat area 127 on the valve element 122 to open an atmosphere valve 128. This allows the atmosphere to be introduced into the variable pressure chambers B, D, thus operating the tandem brake booster 101 as an automatic brake.

In the present embodiment, an arrangement is made such that when the piston 139 is moved rearward relative to the valve body 106 and the valve plunger 117 against the force which urges it under the condition shown in FIG. 7 in which the tubular member 145 is positioned at its forwardly located operative position in response to the movement of the piston 139, the second seat area 127 on the valve element 122 can abut against the atmosphere valve seat 118 formed on the tubular member 145 to permit the atmosphere valve 128 to be closed. More specifically, when the solenoid 138 is energized and the tubular member 145 is positioned at its operative position as shown in FIG. 7, the tandem brake booster 101 is operated without depressing a brake pedal. As the valve body 106 is driven forward and an output increases, a reaction from the output also increases, resulting in the reaction disc 152 bulging rearward to abut against the plate plunger 146 initially and moving it rearward with respect to the housing 141 or the valve body 106 (FIG. 8). Concomitantly, the rear end face of the plate plunger 146 abuts against the front end 143a of the sleeve 143 to push the piston 139 and the tubular member 145 rearward relative to the valve body 106 against the resilience of the spring 144 and the force which urges the piston 139 forwardly. In this manner, an abutment between the atmosphere valve seat 118 and the second seat area 127 on the valve element 122 occurs to close the atmosphere valve 128 (FIG. 8). This closes both the vacuum valve 124 and the atmosphere valve 128, whereupon an increase in the output from the tandem brake booster 101 ceases, maintaining the output which then prevails.

In other words, the present embodiment is arranged such that when the tandem brake booster 101 is operated as an automatic brake, as the reaction disc 152 is elastically deformed to bulge rearward in response to a reaction from the output, an increase in the bulge causes the tubular member 145 (and hence the atmosphere valve seat 118) to be pushed back rearward relative to the valve body 106. This allows the atmosphere valve 128 to be closed before the output from the tandem brake booster 101 rises to its maximum output which is determined by the diameters of the both power pistons 111, 112, whereupon the output ceases to rise. Consequently, the output from the booster when it is operated as an automatic brake is suppressed to a relatively low output.

It will be understood from the foregoing description that in the third embodiment, a combination of the plunger plate 146, the sleeve 143, the spring 144, the piston 139, the connection member 148 and the tubular member 145 constitutes together output restriction means which restricts the output from the booster when it is operated as an automatic brake.

Operation

In the arrangement described above, when the solenoid 138 is not energized and the booster is in its inoperative condition without the depression of a brake pedal, not shown, the valve plunger 117 is maintained in its inoperative position in which it is engaged with the key member 137 which abuts against the wall surface 102a of the shell 102, as shown in FIG. 6. The piston 139 and the tubular member 145 which are urged by the spring 144 are maintained in their inoperative positions in which the rear stepped end face 139b of the piston 139 abuts against a stepped end face which represents a boundary between the portion 117b of a reduced diameter and the portion 117c of a medium diameter of the valve plunger 117.

The sleeve 143 is maintained at its advanced end position, and the rear end 143b of the sleeve 143 and the tapered surface 139a of the piston 139 are spaced apart. The front end face of the valve plunger 117 projects slightly forward of the front end 143a of the sleeve 143 which is maintained at its advanced end position, and abuts against the plate plunger 146. A slight clearance is maintained between the plate plunger 146 and the reaction disc 152.

The vacuum valve seat 116 is removed from the first seat area 123 on the valve element 122 to open the vacuum valve 124 while the second seat area 127 on the valve element 122 is seated upon the atmosphere valve seat 118 to close the atmosphere valve 128. The chambers A, B, C and D communicate with each other, and a negative pressure is introduced into these chambers.

When a brake pedal, not shown, is depressed under this inoperative condition, the input shaft 135 and the valve plunger 117 are driven forward, whereby the piston 139 which abuts against the valve plunger 117 and the tubular member 145 connected therewith are also driven forward. This causes the first seat area 123 on the valve element 122 to be seated on the vacuum valve seat 116 to close the vacuum valve 124 while the atmosphere valve seat 118 moves away from the second seat area 127 to open the atmosphere valve 128. This interrupts the communication between the both constant pressure chambers A, C and the both variable pressure chambers B, D, and the atmosphere is introduced into the both variable pressure chambers B, D. The pressure differential between the negative pressure within the both constant pressure chambers A, C and the atmospheric pressure within the both variable pressure chambers B, D drives the both power pistons 111, 112 and the valve body 106 and their associated parts forward.

The tandem brake booster 101 is actuated in this manner, but a reaction from the output acting upon the output shaft 151 causes the axial portion of the reaction disc 152 to bulge rearward and to abut against the plate plunger 146. Accordingly, from this point in time, a reaction from the output acting on the output shaft 151 is transmitted to a driver through the valve plunger 117 and the input shaft 135.

If the driver now releases the brake pedal, the valve body 106 and associate parts are returned to their inoperative positions shown in FIG. 6 by the return spring 154. Also at this time, the resilience of the coiled spring 144 returns the piston 139, the tubular member 145 and the valve plunger 117 to their inoperative positions shown in FIG. 6.

The operation of the tandem brake booster 101 which takes place normally when a brake pedal is depressed is as described above. In other words, as long as the solenoid 138 is not energized, the piston 139 and the tubular member 145 remain in their inoperative positions shown in FIG. 6, and move back and force in an integral manner with the valve plunger 117.

Operation as an Automatic Brake

By contrast, when the tandem brake booster 101 is to be operated as an automatic brake, the solenoid 138 is energized by a controller under the inoperative condition shown in FIG. 6, without depressing a brake pedal, not shown. This causes the piston 139 and its integral tubular member 145 to be moved to their forwardly located operative positions shown in FIG. 7 relative to the valve body 106 and the valve plunger 117 against the resilience of the coiled spring 144.

Concomitantly, the valve element 122 is moved forward, with its first seat area 123 becoming seated on the vacuum valve seat 116 to close the vacuum valve 124. Subsequently, the atmosphere valve seat 118 formed on the tubular member 145 moves away from the second seat area 127 on the valve element 122 to open the atmosphere valve 128. This allows the atmosphere to be introduced into the both variable pressure chambers B, D, developing a pressure differential between the atmospheric pressure within the both variable pressure chambers B, D and the negative pressure within the both constant pressure chambers A, C to drive the both power pistons 111, 112 and the valve body 6 forward, thus operating the tandem brake booster 101. In this manner, the tandem brake booster can be operated to function as an automatic brake, without depressing a brake pedal. Because a brake pedal is not depressed, the valve plunger 117 remains stationary. Accordingly, the front end 143a of the sleeve 143 moves forward relative to the front end face of the valve plunger 117 (FIG. 7). This means that, in the relative sense, the front end face of the valve plunger 117 is retracted rearward of the front end 143a of the sleeve 143.

When the tandem brake booster 101 is operated as an automatic brake in this manner, a reaction from the output increases as a result of an increase in the output to cause an axial compression of the reaction disc 152. Accordingly, the axial portion of the reaction disc 152 bulges rearward to abut against the plate plunger 146, pushing the plate plunger 146 gradually rearward (FIG. 7).

During such process, the plate plunger 146 abuts against the front end 143a of the sleeve 143 to push it back rearward, whereby the sleeve 143 is pushed back rearward relative to the valve body 106 against the resilience of the coiled spring 144 and the force which urges the piston 139 forwardly.

As a consequence, the atmosphere valve seat 118 formed on the tubular member 145 becomes seated on the second seat area 127 on the valve element 122 to close the atmosphere valve 128. At this point, the vacuum valve 124 and the atmosphere valve 128 are both closed to achieve a servo balance condition, interrupting the introduction of the atmosphere into the variable pressure chambers B, D. Accordingly, the output ceases to rise at this point, maintaining the output which then prevails. A maximum output from the tandem brake booster 101 when the servo balance condition is reached is restricted to a low value. Because the force with which the piston 139 is urged forward varies depending on the magnitude of the current passed through the solenoid 138, the output from the tandem brake booster 101 which prevails at the time the servo balance condition is reached also varies. Therefore, the output of the booster can be freely controlled by changing the magnitude of the current, allowing an output from the tandem brake booster 101 when it functions as an automatic brake to be smoothly regulated in the similar manner as mentioned above in connection with the second embodiment. It should be understood that a solenoid of on/off control type may also be used for the solenoid 138 in the third embodiment.

As mentioned above, in the present embodiment, the maximum output from the tandem brake booster 101 when it is operated as an automatic brake is restricted to a small value. Accordingly, if the controller fails to cause an inadvertent energization of the solenoid 138, the output from the tandem brake booster 101 is not allowed to rise to a maximum output which is determined by the maximum diameter of the power piston 111 (and 112), but is maintained at a low level. Accordingly, the occurrence of a quick braking action which might occur as a result of an inadvertent energization of the solenoid 138 independently from the intent of a driver is avoided, but a gentle braking action is assured, thus improving the safeguard.

Since the output from the tandem brake booster 101 of the present embodiment when it is operated as an automatic brake is suppressed to a low level, the brake booster incorporating this feature is preferred for use where a start and a stop are repeated in the event of congested road traffic. The brake booster is also preferred for use as an automatic brake which is used during a so-called cruise control.

While the above embodiments have been described in connection with the application of the invention to a tandem brake booster, it should be understood that the invention is equally applicable to a brake booster of a single type which has a single pair of constant and variable pressure chambers or a brake booster of triple type which contains three pairs of constant and variable pressure chambers.

In the described embodiments, the invention has been described as applied to a brake booster in which a lost motion of the input shaft is reduced by causing the key member 37 (or 37' or 137) to abut against the wall surface 2a (or 2a', 102a') of the shell 2 (or 2' or 102'), but it should be understood that the invention is also applicable to a booster of the type in which a key member is not disposed in abutment against a wall surface of a shell.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A brake booster including a substantially tubular valve body slidably disposed within a shell, a power piston mounted on the valve body, a constant and a variable pressure chamber defined across the power piston, a vacuum valve mounted on the valve body for switching a communication between the constant and the variable pressure chamber, an atmosphere valve mounted on the valve body for switching a communication between the variable pressure chamber and the atmosphere, a valve plunger disposed within the valve body in a movable manner and coupled to an input shaft for movement therewith for opening/closing the vacuum valve and the atmosphere valve, a tubular member disposed within the valve body in a movable manner for opening/closing the vacuum valve and the atmosphere valve, a drive mechanism disposed within the valve body for moving the tubular member, and a reaction disc for transmitting a reaction from an output as the valve body is driven forward to the valve plunger;

characterized by the provision of output restriction means which is operative, whenever the drive mechanism moves the tubular member to its operative position to close the vacuum valve and to open the atmosphere valve, to close the atmosphere valve to restrict an increase in the output as the output increases.

2. A brake booster according to claim 1 in which an annular vacuum valve seat is formed on the rear end of the tubular member, an annular atmosphere valve seat is formed on the rear end of the valve plunger, and a valve element is disposed within the valve body for movement into engagement with or disengagement from the vacuum valve seat and the atmosphere valve seat, a combination of the vacuum valve seat and a first valve seat area on the valve element which moves into engagement with or disengagement from the vacuum valve seat defining the vacuum valve, and a combination of the atmosphere valve seat and a second seat area on the valve element which moves into engagement with or disengagement from the atmosphere valve seat defining the atmosphere valve.

3. A brake booster according to claim 2 in which when the drive mechanism moves the tubular member to a rearwardly located operative position to close the vacuum valve and to open the atmosphere valve, the output restriction means causes the atmospheric pressure which is introduced into the variable pressure chamber to act upon the valve element and the tubular member to urge them forward, the arrangement being such that a balance is achieved between the force which urges the tubular member forward and a force with which the drive mechanism urges the tubular member rearward.

4. A brake booster according to claim 2 in which an arrangement is made such that when the drive mechanism moves the tubular member to its rearwardly located operative position to close the vacuum valve seat, the second seat area on the valve element can be seated on the atmosphere valve seat formed on the valve plunger, and a resilient member, acting as the output restriction means, is provided for temporarily preventing the seating of the second seat area on the valve element on the atmosphere valve seat formed on the valve plunger so that when the drive mechanism brings the tubular member to its operative position, the resilient member, acting as the output restriction means, temporarily prevents the seating of the second seat area on the valve element on the atmosphere valve seat formed on the valve plunger to open the atmosphere valve, thereby allowing the valve body to be driven forward, and when a reaction from the output as the valve body is driven forward is transmitted through the reaction disc to the valve plunger, the resilient member is axially compressed to allow the second seat area on the valve element to be seated on the atmosphere valve seat formed on the valve plunger to close the atmosphere valve.

5. A brake booster according to claim 1 in which an annular vacuum valve seat is formed around the inner periphery of the valve body, an annular atmosphere valve seat is formed on the rear end of the tubular member, and a valve element is disposed within the valve body for movement into engagement with and disengagement from the vacuum valve seat and the atmosphere valve seat, a combination of the vacuum valve seat and a first seat area on the valve element which moves into engagement with or disengagement from the vacuum valve seat defining the vacuum valve, a combination of the atmosphere valve seat and a second seat area on the valve element which moves into engagement with or disengagement from the atmosphere valve seat defining the atmosphere valve, the output restriction means being arranged such that when the drive mechanism moves the tubular member to its operative position to close the vacuum valve and to open the atmosphere valve, the output restriction means pushes back the tubular member to its inoperative position in response to an elastic deformation of the reaction disc as the output rises, whereupon the atmosphere valve seat formed on the tubular member becomes seated on the second seat area on the valve element to close the atmosphere valve.

6. A brake booster according to claim 3 in which the drive mechanism has a variable urging force which is effective to move the tubular member, an annular seal member is disposed between the outer peripheral surface of the tubular member and the inner peripheral surface of the valve body to maintain a hermetic seal therebetween, the annular seal member having an internal diameter which is less than the diameter of the atmosphere valve.

7. A brake booster according to claim 3 in which the drive mechanism comprises a solenoid which can be energized with a current of a varying magnitude to allow an urging force which moves a piston to its operative position to be variable, the tubular member being moved to its operating position in response to a movement of the piston whenever the solenoid is energized.

8. A brake booster according to claim 4 in which the valve plunger is engaged by a key member, an arrangement being provided such that in the inoperative condition in which a brake pedal coupled to an input shaft is not depressed, the key member is held in abutment against a rear wall surface of the shell to reduce a lost motion of the input shaft, the resilient member being disposed on a stepped end face of the valve body which is disposed adjacent to, but rearward of the key member, the resilient member being removed from the key member when the tubular member assumes its inoperative position and abutting against the key member whenever the tubular member assumes its operative position.

9. A brake booster according to claim 4 in which the resilient member is in the form of a Belleville spring.

10. A brake booster according to claim 5 in which the drive mechanism comprises a solenoid disposed within the valve body, the solenoid comprising a substantially cylindrical housing which is fitted into the inner periphery of the valve body, a piston disposed inside the housing so as to be axially movable and connected to the tubular member, and a sleeve slidably disposed in the inner periphery of the housing at a location forward of the piston, the output restriction means being formed by the piston, the sleeve and the tubular member, the arrangement being such that when the solenoid is energized to allow the piston and its connected tubular member are positioned at forwardly located operative positions, the vacuum valve is closed while the atmosphere valve is opened, and such that an increase in a reaction which results from an output as the valve body is driven forward causes an elastic deformation of the reaction disc, which acts through the sleeve to push the piston and the tubular member rearward relative to the valve body to thereby close the atmosphere valve.

11. A brake booster according to claim 10 in which a plunger plate is sidably disposed inside the inner periphery of the housing at a location forward of the sleeve, the sleeve and the piston being normally urged in a direction away from each other by a compression spring disposed therebetween, the output restriction means comprising the plunger plate and the compression spring, an arrangement being such that when the solenoid is energized to bring the piston to its forwardly located, operative position, the compression spring is compressed to cause an abutment between a front portion of the piston and a rear portion of the sleeve and an elastic deformation of the reaction disc in the rearward direction causes the plunger plate to be moved rearward relative to the valve body, whereby the sleeve, the piston which abuts against the sleeve and the tubular member are pushed back rearward relative to the valve body.

12. A brake booster according to claim 1, in which the tubular member comprises a non-magnetic material.

* * * * *

UNITED STATES PATENT AND TRADEMARK OFFICE
CERTIFICATE OF CORRECTION

PATENT NO.  : 6,155,156
DATED       : December 5, 2000
INVENTOR(S) : Yoshiyasu Takasaki, et al.

Page 1 of 2

It is certified that error appears in the above-identified patent and that said Letters Patent is hereby corrected as shown below:

Column 17,
Line 43, replace "opening/closing" with -- opening and closing --.
Line 53, replace "its" with -- an --.

Column 18,
Line 8, delete "the" (first occurrence).
Line 12, replace "the" with -- a --.
Line 17, replace "its" with -- the --.
         delete "rearwardly located".
Line 25, replace "its" with -- the --.
Line 38, replace "the" with -- an --.
Line 42, replace "the" with --
Line 43, replace "the" with -- an --.
Line 52, replace "its" with -- the -- .a --.
Line 55, replace "its" with -- an --.
Line 63, replace "the" (first occurrence) with -- an --.
Line 64, replace "the" (first occurrence) with -- an --.
Line 66, replace "the" with -- a --.

Column 19,
Line 4, replace "its" with -- a second --.
Line 5, replace "its operating" with -- the operative --.
Line 10, replace "the" with -- an --.
Line 17, replace "its" with -- an --.
Line 19, replace "its" with -- the --.
Line 29, replace "the" (first occurrence) with -- an --.

UNITED STATES PATENT AND TRADEMARK OFFICE
CERTIFICATE OF CORRECTION

PATENT NO. : 6,155,156
DATED : December 5, 2000
INVENTOR(S) : Yoshiyasu Takasaki, et al.

It is certified that error appears in the above-identified patent and that said Letters Patent is hereby corrected as shown below:

Column 20,
Line 2, replace "its" with -- the --.
Line 3, after "at" insert -- a plurality of --.
Line 7, replace "an" with -- the --.
Line 20, replace "its" with -- a --.
Line 22, replace "an" with -- the --.

Signed and Sealed this

Twenty-third Day of October, 2001

Attest:

*Attesting Officer*

NICHOLAS P. GODICI
*Acting Director of the United States Patent and Trademark Office*